United States Patent [19]

Barham

[11] 4,057,930
[45] Nov. 15, 1977

[54] HYDROPONIC METHOD AND APPARATUS

[76] Inventor: Rayford A. Barham, 9101 Snowheights Northeast, Albuquerque, N. Mex. 87112

[21] Appl. No.: 668,064

[22] Filed: Mar. 18, 1976

Related U.S. Application Data

[63] Continuation-in-part of Ser. No. 496,448, Aug. 12, 1974, abandoned.

[51] Int. Cl.$^2$ ............................................. A01G 31/02
[52] U.S. Cl. .......................................... 47/61; 47/16; 47/62; 47/58
[58] Field of Search ............................ 47/1.2, 14–16, 47/58, 59–64; 4/180; 119/5; 61/13

[56] References Cited

U.S. PATENT DOCUMENTS

| | | | |
|---|---|---|---|
| 1,350,229 | 8/1920 | Lee | 61/13 |
| 2,138,188 | 11/1938 | Morley | 47/34 A |
| 2,198,150 | 4/1940 | Barnhart | 47/1.2 |
| 2,334,232 | 11/1943 | Wells | 47/16 X |
| 2,592,976 | 4/1952 | Thomas | 47/1.2 |
| 3,305,968 | 2/1967 | Dosedla et al. | 47/1.2 |
| 3,660,933 | 5/1972 | Wong, Jr. | 47/1.2 |
| 3,759,223 | 9/1973 | D'Andrea | 119/5 |

FOREIGN PATENT DOCUMENTS

| | | | |
|---|---|---|---|
| 80,265 | 11/1955 | Denmark | 47/1.2 |
| 1,266,589 | 6/1961 | France | 47/1.2 |
| 234,040 | 12/1968 | U.S.S.R. | 47/1.2 |

OTHER PUBLICATIONS

"Influence of Continuous Aeration upon the Growth of Tomato Plants in Solution Cultures" Clark, et al., Soil Science vol. 34, 1932.

Primary Examiner—Clifford D. Crowder
Assistant Examiner—Steven A. Bratlie
Attorney, Agent, or Firm—Strauch, Nolan, Neale, Nies & Kurz

[57] ABSTRACT

The apparatus includes a seed supporting screen mounted a predetermined distance above a water reservoir in which an aerator grid is immersed to provide a circulating flow of moisture droplets and moisture laden air around and through the screen to provide a maximum supply of the nitrogen in ordinary air to the seed roots exposed to the moisture laden air. The air coming up from the grid agitates and aerates a surface layer of the water supply. A regulatable preset thermostatically controlled heater is provided. The seed support screen is mounted in predetermined spaced relation above the level of the water in the reservoir below the screen. The method disclosed includes maintaining the water at a desired temperature while air is forced through the aerator grid introducing an even distribution of air bubbles into the water. The bubbles rise to the surface and break to thus continuously bathe the seed with an abundant supply of moisture droplets and moisture laden air for substantially accelerating growth.

18 Claims, 11 Drawing Figures

HYDROPONIC METHOD AND APPARATUS

CROSS-REFERENCE TO RELATED APPLICATION

This is a continuation-in-part of Ser. No. 496,448 filed Aug. 12, 1974 now abandoned.

BACKGROUND OF THE INVENTION

This invention relates to the sprouting of various kinds of seeds and more particularly concerns an improved hydroponic method and apparatus for accelerated but not forced growth of seed sprouts in a novel atmosphere of mostly air and water droplets wherein circulation, humidity and temperature are easily controlled.

The sprouting of seeds for human and animal consumption is an art dating back several thousand years and probably having its origins in the Chinese culture. There are many types of seed sprouts which provide quick energy foods which are low in calories and provide substantial quantitites of protein, vitamins, minerals, amino acids and essential enzymes. Such seed sprouts are considered to be organically pure since it is not necessary that they be sprayed, dusted, dipped, or chemically treated or fertilized in any manner. Among the best known sprouts are those particularly deriving from the Chinese cuisine, these being beans such as mung beans, soy beans, etc. Among many other types of seeds which are inexpensive, nutritious, tasty, and easily sprouted are alfalfa, wheat corn, lentils, etc. Further suggestions of seeds which may be sprouted as well as methods for sprouting are found in THE COMPLETE SPROUTING COOKBOOK, by Karen Cross Whyte, published in 1973 by Troubador Press.

The art of hydroponics began in the mid 1930's, and it concerns the cultivation of plants in solutions without the use of soil. Methods differing in particulars have been developed but all heretofore known methods have two common features. First, plant nutrients are supplied in liquid solutions. Secondly, the plants are mechanically supported in some method, usually in some porous material such as peat, sand, gravel or glass wool which acts as a wick in relaying the nutrient solution to the roots of the plants. In other instances, particularly in known seed sprouters, the seeds are merely laid upon some type of simple porous support.

Several classifications of hydroponic culture methods are currently being used. The most practical one for commercial application is the sub-irrigation method in which plants are grown in gravel filled trays which are periodically flooded with nutrient solution. The solution is then allowed to drain after use and is then reused and may continue to be reused so long as sufficient nutrients remain in the solution. One major difficulty with this method is that the reused solution contains an unhealthy quantity of pollutants and other waste materials which are washed back onto the plants being grown. Thus, the opportunities for disease or rot are alarmingly high. Experience has shown the rotting or infection of but one or several seeds or plants soon spreads and ruins the entire crop. A second method is the so called water-culture method in which procelain jars are filled with solution and plants are placed in beds of glass wool or like material which are supported at the surface of the solution. The roots of the plants remain in the solution during growth. Again, the major problem with this method is the growing of plants in a stagnant solution wherein plant waste products and other pollutants are not carried away from the growing plants. Another method is the "slop" method in which quantities of solution are merely poured on the plant's support media in approximately equal amounts at regularly timed intervals. A variation on this theme is a dipping method in which the plant growth media is merely dipped into a nutrient solution at regularly timed intervals. A further refinement of these latter two practices is the so called drip method wherein a steady slow feed of nutrient solution is allowed to drip onto the growing plant media. In each of these cases, the nutrient solution is allowed to drain off of the growth media.

More recently developed hydroponic methods, particularly in the art of sprouting seeds, have included closed chambers having a sump, a water spray system, and a heating arrangement such as disclosed in U.S. Pat. No. 3,768,201 issued to Byong W. Yoo and in the Danish Pat. No. 80,265 issued to Michel F. Mahoudeau. A sprouter including a spiral aerator in a liquid supply in which seeds are soaked to be germinated is disclosed in U.S. Pat. No. 3,233,366. A similar system but one in which the seeds are suspended above the liquid and sprouted is disclosed in the Russian Pat. No. 234,040 issued to P. V. Danilchuk et al. A similar system is disclosed in U.S. Pat. No. 2,198,150 issued to G. E. Barnhardt. A major drawback in the invention disclosed in both of these latter two patents is that aeration is initiated at the base of a liquid supply whereafter moist air circulated about the seeds and roots being sprouted. However, waste products and other pollutants being deposited back into the liquid supply from the roots have no place to go but back to the aerator to be recirculated onto the plants thereby increasing the possibilities of rot and/or disease as discussed hereinbefore.

Of course, there are a number of additional United States and foreign patents which disclose one or more prior art features as discussed in various combinations. However, the ones most pertinent to the instant invention have been discussed above.

A number of problems have been observed with the use of known devices and methods for seed germination and sprouting in particular. Some of the known devices are rather complex and expensive and others require substantial periods of time of seed germination and sprout growth. A significant problem is that of bacterial or fungus growth caused principally by prevailing stagnant conditions as hereinbefore discussed. When just a few seeds (or in some cases only one seed) reach a stage of souring or rot, the entire crop may become quickly infected and soon completely spoiled. In general, the sprouting devices which are currently available operate in a manner which produces the deleterious condition of a stagnant environment, and this is principally due to a lack of air and water circulation. Where this problem has been recognized, such currently available sprouters include means for rinsing the seeds periodically in an attempt to deter bacterial growth that will otherwise occur. However, in such cases the waste product and pollutant laden solution is merely redistributed later back onto the sprouting plants; thus, the rinsing technique is no solution to the problem.

OBJECTS OF THE INVENTION

Therefore, it is a principal object of the present invention to provide an improved hydroponic method and apparatus for germinating of seeds in order to produce superior plants and sprouts.

It is an object of the invention to provide a hydroponic chamber in which seeds to be germinated and sprouted are suspended a predetermined distance above a level of liquid whereby germination and sprouting occur without immersing the seed in water during the growth period.

It is a further object of the invention to provide a hydroponic apparatus in which seeds to be sprouted are supported on a screen spaced a predetermined distance above a heated supply of water, the distance being calculated according to the length of root of the crop, and air being bubbled through a grid system disposed in an upper layer of the water to cause air bubbles to coalesce and burst beneath the screen to thus provide a circulating flow of preheated moisture droplets as well as moisture laden air in and around the growing sprouts.

Yet another object of the invention is to provide a hydroponic method wherein roots of sprouts are continuously bathed by moisture laden air and moisture droplets to thus obviate any stagnate conditions about the roots and further provide an upper layer of water agitated by air bubbles and a lower, undisturbed supply into which plant waste products and other pollutants may fall so as not to be recirculated onto the crop.

It is a still further object of the invention to provide a hydroponic method wherein the root structure of sprouts is continuously bathed by moisture droplets and moisture laden air to thereby provide a maximum supply of the nitrogen of ordinary air which may be absorbed into the growing sprouts' roots, apparently directly from the air.

Further novel features and other objects of the invention will become apparent from the following detailed description, discussion, and the appended claims taken in conjunction with the accompanying drawings.

BRIEF DESCRIPTION OF THE DRAWINGS

Preferred structural embodiments of this invention are disclosed in the accompanying drawings in which.

DESCRIPTION OF THE PREFERRED EMBODIMENTS

Figure 1:
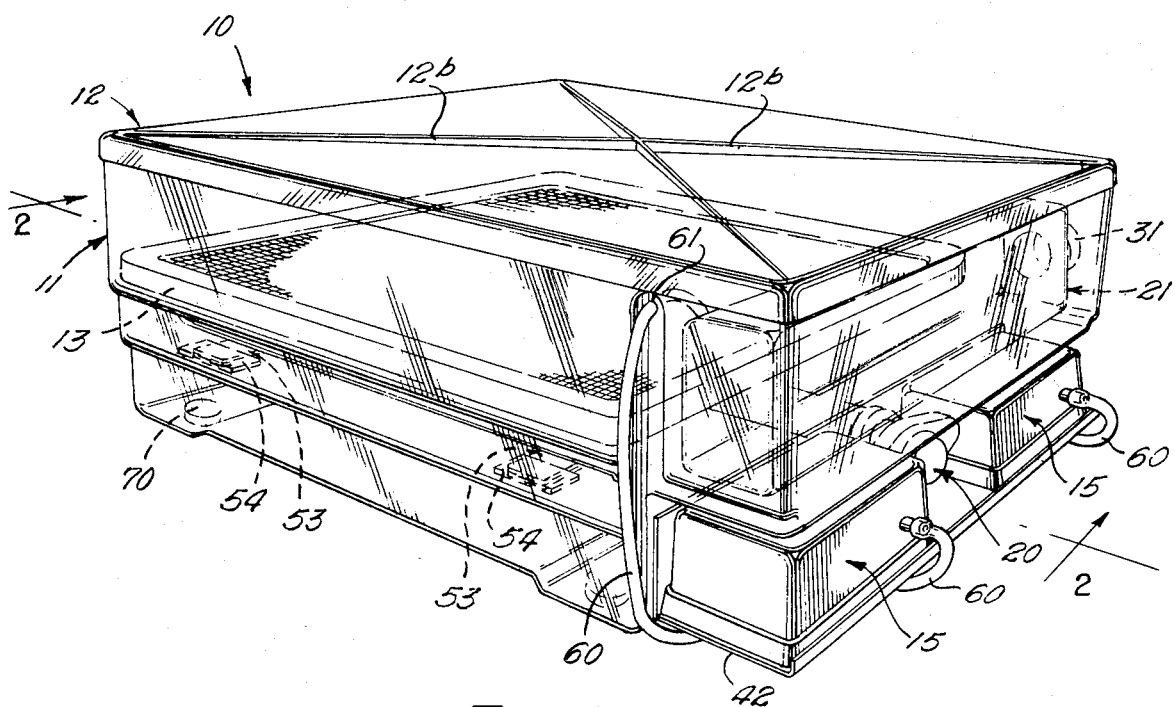
FIG. 1 is a view in perspective of one embodiment of a hydroponic chamber.

With reference to FIGS. 1-5 inclusive, a hydroponic chamber 10 includes an open-top liquid holding chamber 11 and a removable top or cover 12, both chamber 11 and cover 12 preferably being made of plastics material which may be transparent as illustrated. A seed support screen 13 is removably mounted in the chamber 11 and spaced above an aerator grid 14 which is connected to a pair of air pumps 15 which supply a constant regulated flow of air to aerator grid 14. A water heater 20 is mounted in the lower portion of chamber 11. A constant predetermined level of water is provided in chamber 11 by means of a barometric feed liquid supply bottle 21.

Chamber 11 has an enlarged upper portion 11a which defines an upper growth chamber 22 and further includes a portion 23 at one end for housing the liquid supply bottle 21. A reduced peripheral shoulder 11b is provided to support the seed screen assembly and a second reduced peripheral lip or shelf is provided at 11c to support aerator grid 14 and further to define a water reservoir space 24 beneath aerator grid 14.

Floor 11e which supports liquid supply bottle 21 has a small depression 25 which defines a water flow passage 30 to direct water from the bottle 21 along the shelf and into reservoir 24 of chamber 11. Bottle 21 has a fill neck 21a at one end and a cap 31 screw-threaded thereon. A wall 32 of chamber 11 adjacent shelf depression 25 has an inwardly projecting boss 33 (FIG. 3) which is so spaced relative to end wall 34 of bottle space 23 that only the end of bottle 21 with cap 31 will fit into space 23, thus making it impossible to install the water bottle in the incorrect position. A side 21b of water bottle 21 has an opening 35 (FIG. 3) which registers with depression 25 in shelf 11e and thus permits water or liquid to be gravity fed from bottle 21 into reservoir 24 of chamber 11 (FIG. 2).

Figure 2:
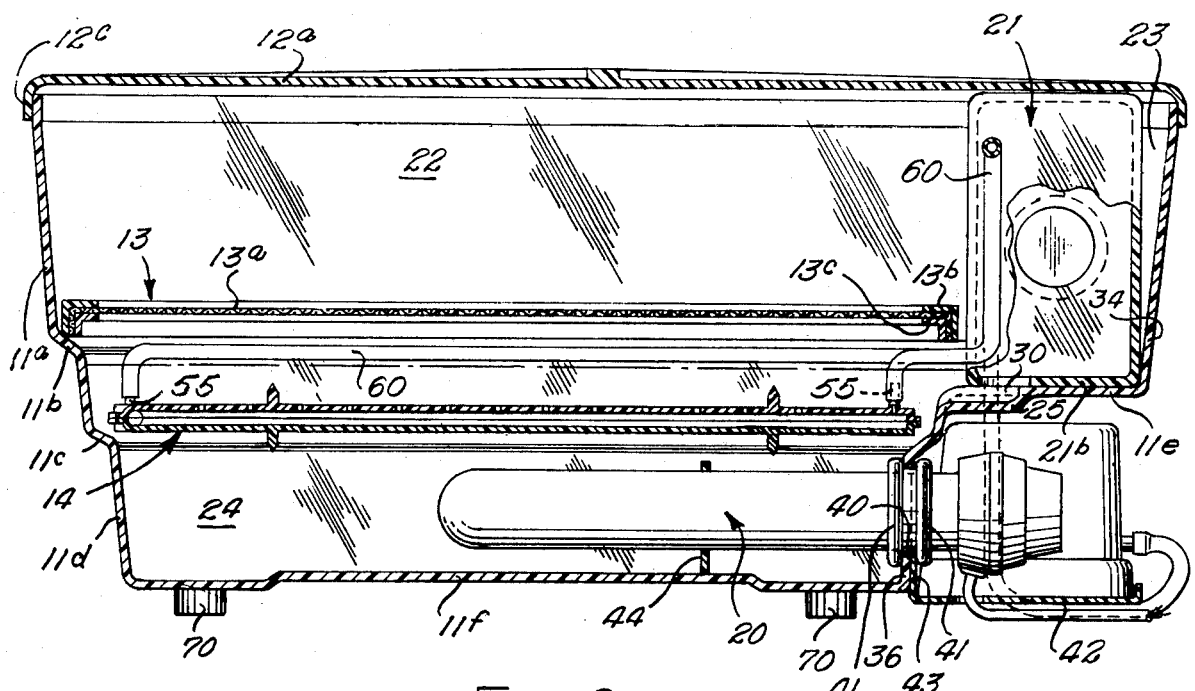
FIG. 2 is a section view taken along lines 2—2 of FIG. 1, and drawn to enlarged scale.

Referring to FIG. 2, end wall 36 of reservoir 24 has a central opening 40 formed therein for inserting of a water heater 20. An outer mounting shelf 42 having a wall portion 43 supports a pair of air pumps 15. Wall 43 has an opening registering with opening 40 and ring seals or grommets 41 are located around heater 20 and along the inside face of wall 36 and the outside face of wall 43 to thereby provide a watertight seal around the heater which is inserted therethrough into reservoir 24. A support member 44 may be provided on the top of reservoir bottom 11f to support the inner portion of heater 20 inside of chamber 11.

The top 12 of hydroponic chamber 10 includes a top panel portion 12a along which is formed a pair of cross strengthening ribs 12b. A peripheral lower flange 12c is sized to fit tightly over the corresponding mating walls of chamber 11 so that top 12 fits snugly on chamber 11 yet can be easily removed for cleaning the chamber, placing seeds on screen 13 and harvesting the mature sprouts.

Screen 13 may be formed from a porous plastic, metal, silk or nylon screening material 13a, such being examples of the material which will not deteriorate under the high moisture-temperature environment which will be provided inside of the hydroponic chamber 10. Mesh diameter will vary depending upon the size of the seed to be grown. In any event it is desirable that the mesh diameter be sufficiently large to allow maximum flow of moisture laden air and moisture droplets through the screen yet not be so large as to allow the seed to fall downwardly to the bottom of chamber 11. As shown in FIG. 2, screen 13a is tautly clamped between outer female and inner male frame members 13b and 13c respectively. The members are sized to snap together and stretch the screen taut.

Figure 3:
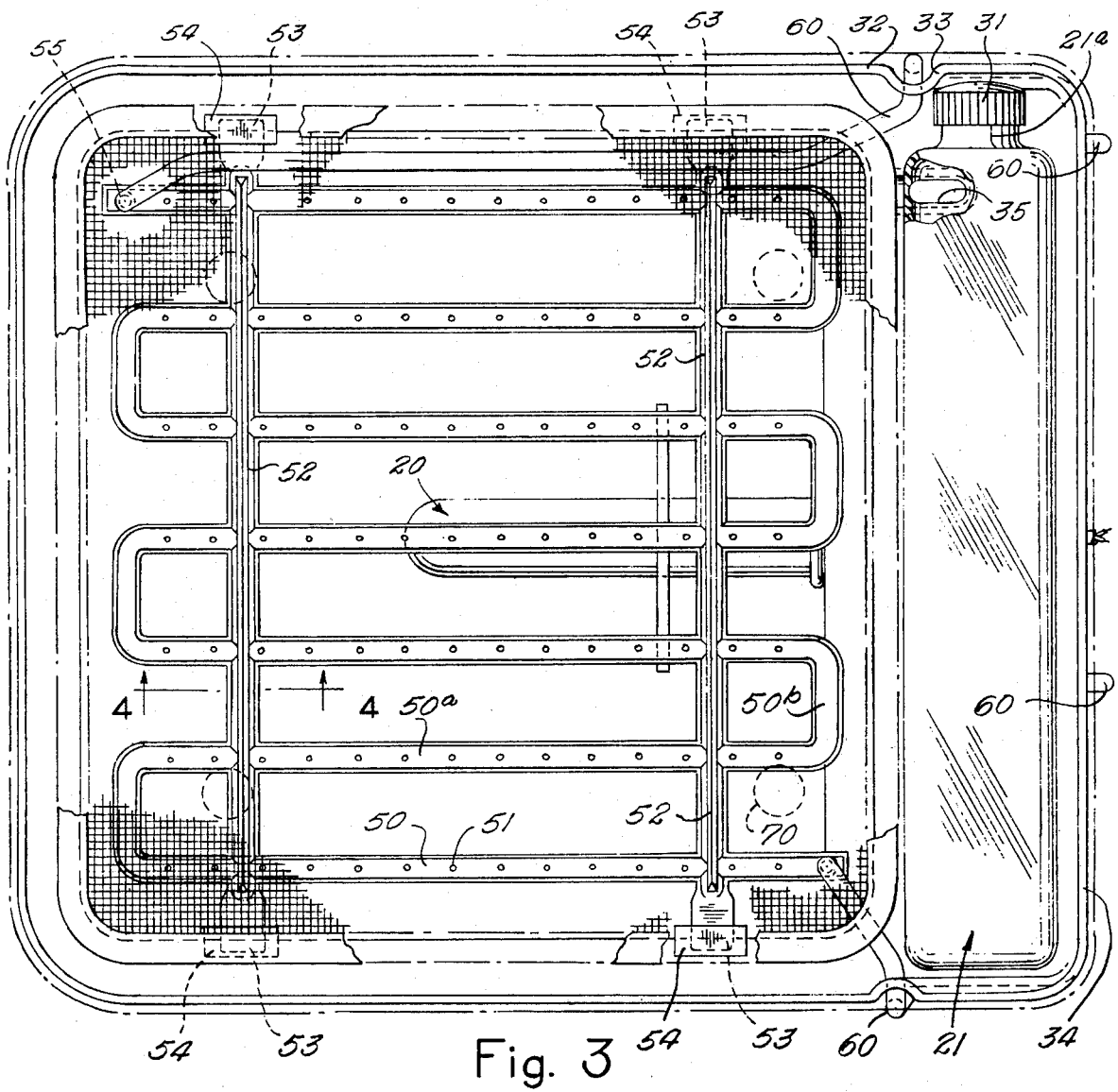
FIG. 3 is a top plan view of the hydroponic chamber shown in FIGS. 1 and 2 with parts broken away to reveal interior detail, a cover being illustrated in phantom lines.

In this embodiment, aerated grid 14 is formed in serpentine fashion from a tube 50 having a plurality of spaced perforations 51 along the top of the entire length thereof (FIG. 3). Tube 50 thus includes a plurality of spaced apart straight sections 50a interconnected at alternate ends by short sections 50b. As can be seen in FIG. 3, perforations 51 are thus distributed uniformly over substantially the entire horizontal area of hydroponic chamber 10 beneath screen 13.

Serpentine tube 50 is braced into a rigid planar structure by a pair of spaced apart struts 52 which are integrally formed with tube 50 and have tabs 53 at their ends which are inserted beneath retainer plates 54 on shoulder 11c (FIG. 3) for thus supporting the grid as shown in FIG. 2. Tabs 53 may be molded as integral end portions of the struts 52 and are formed sufficiently thin and flexible so that they may be easily bent slightly to be inserted under plates 54. In this manner, grid 14 is securely held in place yet is easily removed for cleaning and/or repair.

The respective terminal ends of tube 50 are provided with an upwardly extending nipple 55 over which is inserted an end of an air flow tube 60 extending from one of the air pumps 15. In this embodiment, two air pumps 15 are provided on shelf 42 (FIG. 1). The respective tubes 60 are directed to opposite sides of container 11 where each enters chamber 11 at the top thereof through a hole 61. Thus, tube 50 is supplied with a substantial quantity of air from its opposite ends to thereby assure an even level of air pressure throughout tube 50 and thus uniform bubbling throughout the grid from each perforation 51.

If desired, bottom 11f of container 11 may be provided with four spaced support feet 70 made of rubber or similar suitable resilient material.

In the case of both embodiments shown, heater 20 and the pumps 15 are standard, regulatable aquarium components. Heater 20 includes a thermostatic control system which will enable the water temperature to be varied from a range of about 35° F to about 115° F. Normally, the water is maintained within a range of about 68° F to 92° F. Each air pump 15 has a capacity of about 85 cubic feet per hour at a pressure of about 4.5 psi. The heater 20 is rated at about 25-50 watts. Of course, the ratings and capacities of the heater and pumps would be accordingly increased for substantially larger, commercial units.

Figure 9:
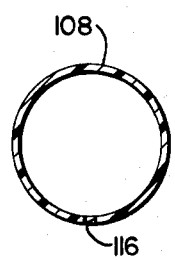
FIG. 9 is a sectional view through a tubular member of the aerator grid, the embodiment shown in FIG. 6.
Figure 7:
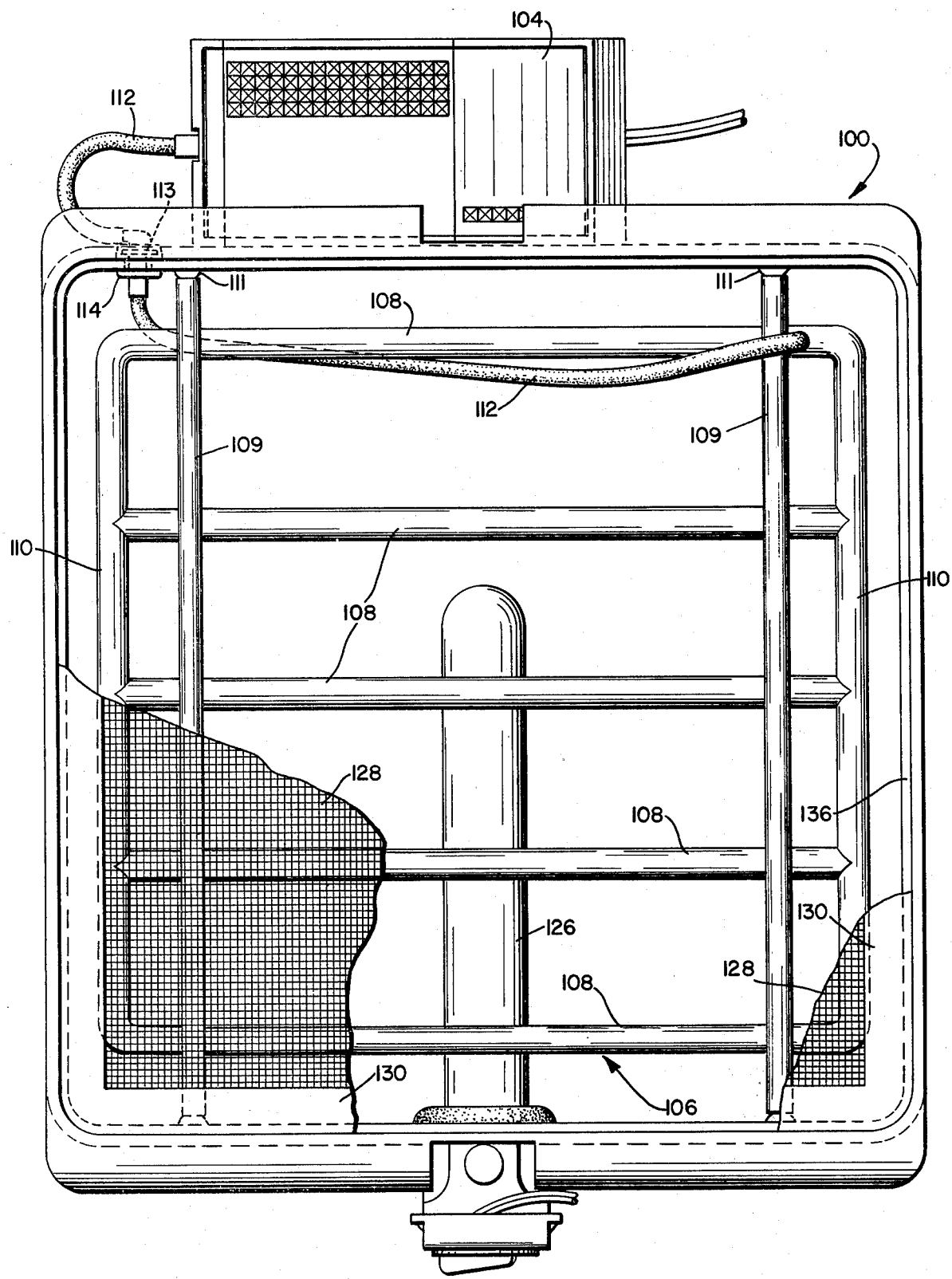
FIG. 7 is a top plan view with parts broken away to show interior detail of the embodiment shown in FIG. 6 and drawn to an enlarged scale.

Turning now to FIG. 6–11, additional embodiments of the invention will be disclosed in detail. Chamber 100 is generally square in its horizontal plane and includes a shelf 102 attached at one end thereof for supporting a single air pump 104. As shown in FIG. 7, an aeration grid 106 includes a plurality of tubes 108 manifolded to one another at 110 and connected to pump 104 by means of air flow tube 112 fitted through an end wall of chamber 100 at 114 as shown. A pair of struts 109 secure grid 106 in chamber 100 by being snap-fit into four resilient hemispheres 111. Thus grid 106 may be easily removed for cleaning, repair or replacement. In another embodiment, struts 109 might be replaced by four projections in the middle of each of the long sides of grid 106, snap-fit into mating dimples formed on the interior of the four respective walls of chamber 100 (not shown). A check valve may be provided at 113 to prevent the possibility of backflow into the pump 104 when it is inoperative. In this embodiment, each tube 108 is perforated at the bottom thereof, as shown in FIG. 9 at 116. Each perforation 116 is extremely small with respect to the diameter of tube 108 so that grid 106 is, essentially, a storage tank holding a static head of relatively uniform pressure therein to thereby assure equal supply of air through perforations 116 throughout the grid. In one embodiment, tubes 108 are about ¼ inch in diameter (6.4 mm) while the diameter of each perforation 116 is about 0.006 inches (0.15 mm). Thus, the ratio of diameter of feet to 108 to a perforation 116 is on the order of about 40 to 1.

In the embodiment of FIG. 9 the perforations 116 are formed on the bottom of tube 108 so that when air pump 104 is not operating, water will not leak into the tubes, as would be the case if the perforations were on top of the tubes. Of course, this assumes that the system is otherwise airtight which is assured by the provision of check value 113.

Figure 10:
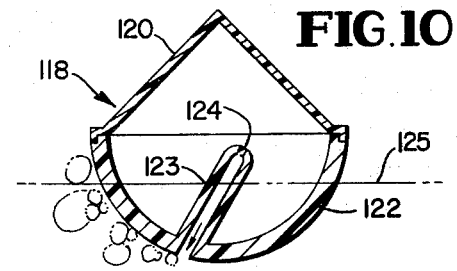
FIG. 10 is a section view similar to FIG. 9 but showing another embodiment of the invention.

In another embodiment of the invention, tube 108 might be formed as shown in FIG. 10 at 118, being formed of two mating members 120, 122 which may be cemented together or otherwise suitably joined at their juncture. The lower member 122 may further include a series of recesses 123, each having a perforation 124 therein. Recesses 123 are skewed from a vertical axis to assure that air bubbles emerge from only one side thereof, in order to assure an even bubbling pattern in a horizontal plane as it can be assured that the bubbles will emerge from the sides of the tube in a precise location. Alternatively, recesses 123 might be formed symmetrically about a vertical plane and the whole tube 118 turned to one side to assure the described bubbling pattern (not shown). The recesses will be about 0.03" (0.79 mm) in internal diameter and perforations 124 are about 0.006" in diameter. Alternatively, with this embodiment, the water level may be at 125 as shown to absolutely assure that perforations 124 will not be contacted by water and possibly become clogged with alkaline deposits.

Through an end wall opposite the one where pump 104 is mounted is the heater 126 inserted into chamber 100 and constructed and operable in the same manner as heater 20 hereinbefore discussed with respect to the first embodiment of the invention.

Figure 8:
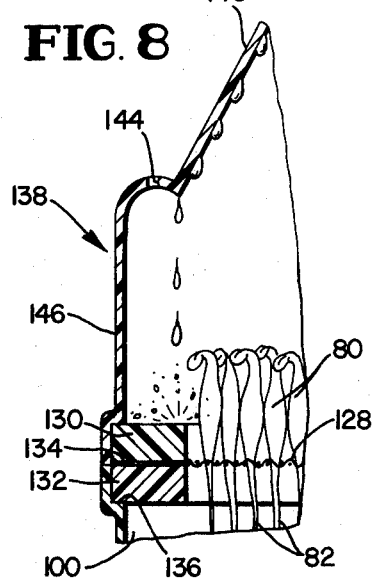

Seeds to be grown are supported on a screen 128 which may be made of bronze or other suitable material which will be relatively unaffected by the warm, moist environment within chamber 100. In one embodiment the screen is stretched taut and retained in a frame made of two similar, mating borders 130, 132 and a layer of adhesive 134 therebetween to secure all the parts together (FIG. 8). In another embodiment, the border could be injection molded or formed as a one piece border around the grid screen. The screen frame is supported on a peripheral lip 136 formed about chamber 100 at the top thereof, as shown in FIG. 8. Turning again to FIG. 6, chamber 100 may be surmounted by a cover 138 which is in the form of a pyramid shaped dome 140 having a peripheral border 142 which may be slotted at 144 with through air holes. Pyramid dome 140 may include a lower integral surrounding spacer 146 as shown to provide sufficient vertical clearance for sprouts being grown inside the chamber 100. In any event, border 142 is so dimensioned and situated above the borders 130, 132 of screen 128 so that moisture condensing on the interior walls of pyramid 140 will migrate downwardly therealong and drop therefrom onto frame border 130, thereby preventing stagnant condensate from falling on the sprouts being grown and further preventing the condensate from migrating outwardly of chamber 100.

Figure 11:
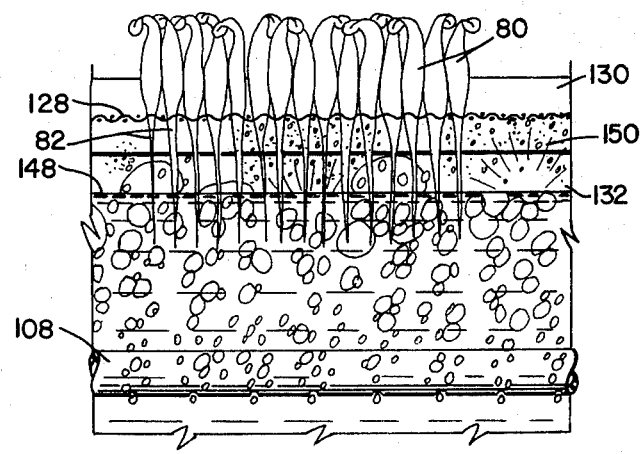
FIG. 11 is a view similar to FIG. 5 but showing the operation of the embodiment disclosed in FIG. 6.

Turning now to FIG. 11, the unique bubbling action of this embodiment of the invention is shown quite clearly. Air enters the water from beneath each of the tubes 108 and bubbles upwardly through a layer of water defined between tubes 108 and the surface 148 of the water whereupon, probably due to the surface tension of water, individual bubbles coalesce to form larger bubbles which eventually burst as shown at 150 into minute water droplets which are passed around, upwardly and through the root structure of growing sprouts as shown and screen 128 as well. Further, it has been observed that the bubbles coalescing on the surface 148 tend to move about the surface in irregular patterns a substantial amount to thereby actually create a circulation of water droplets and moisture laden air around and through the seeds and subsequent sprouts and their roots' structure.

Figure 5:
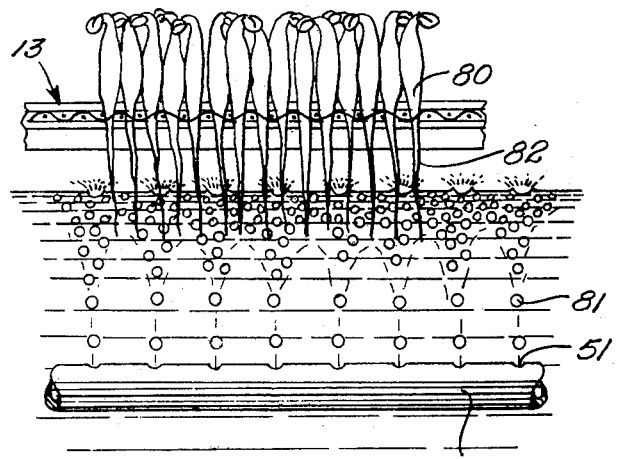
FIG. 5 is a partial elevation view showing the hydroponic chamber shown in FIGS. 1-4 in operation as a crop is sprouting.
Figure 4:
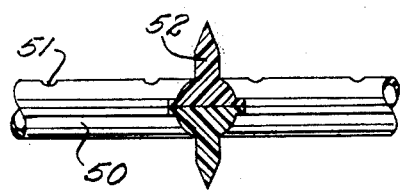
FIG. 4 is an enlarged fragmentary view in section taken along lines 4—4 of FIG. 3.
Figure 6:
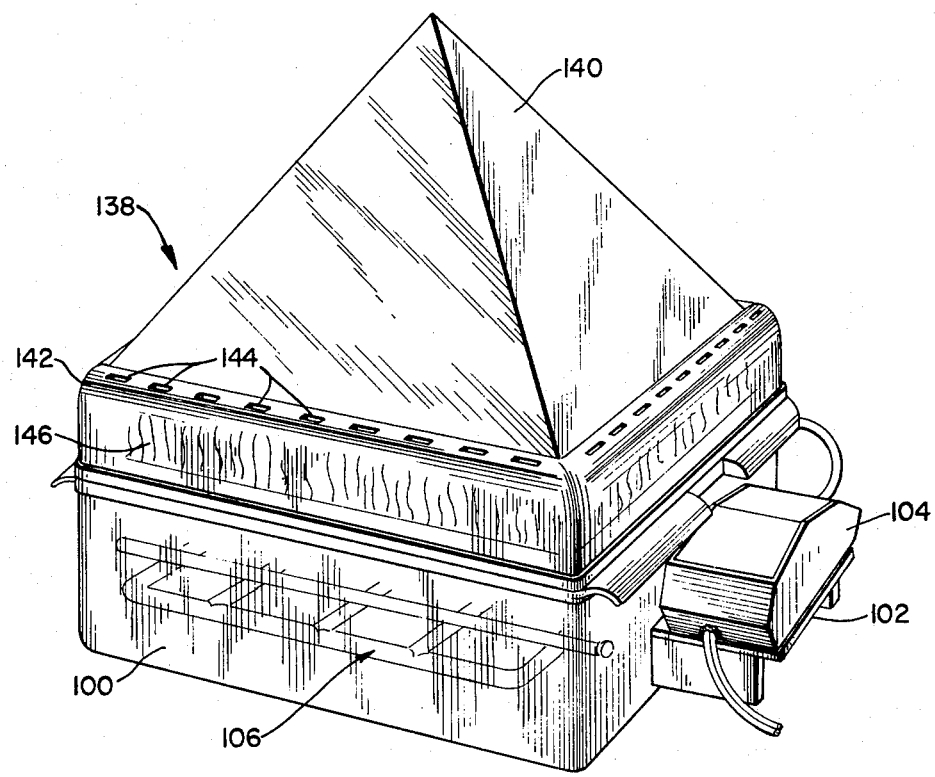
FIG. 6 is a perspective view similar to FIG. 1 but showing another embodiment of the invention.

A comparison of FIGS. 5 and 11 is now in order. Essentially, both figures depict the same in action, the exception being of course that the perforations of the embodiment of FIG. 5 are in the top of tube 50; in FIG. 11, they are on the bottom of tubes 108. In any event, the action is similar and a number of sprouts 80 are shown with their root structures 82 depending downwardly to the surface of a layer of water defined between the aeration grid and the surface of the liquid or water in each embodiment. In both cases, sprouts 80 and their root structures 82 are being continuously bathed with an agitated supply of moisture laden air and moisture droplets. This bathing of mostly air and a little water exposes the roots to such a quantity of nitrogen that it is suspected that the roots are able to absorb nitrogen directly from the air and thus grow at an accelerated rate. Specifically, it has been found that the sprout growth rate obtained with this invention permits crops to be grown and harvested in 40% of the time usually required with presently available apparatus of this kind. Specifically, it has been found that seeds may be sprouted and are ready for harvesting within about 40-48 hours, a far shorter time than that required of other sprouters wherein the normal growth period is about 120-168 hours. Even though the growth rate is greatly accelerated, the growth is not forced. Forced growth usually results in a quicker growth rate, but a resulting crop which is long and stringy and thus quite undesirable. On the other hand, accelerated growth means that the crop is grown in a much shorter period of time, yet the crop is plump and fully mature as if it were grown in a completely normal manner.

As can be seen in both FIGS. 5 and 11, the bulk of the root structure 82 remains above the surface 148 of the liquid and only the very tips of roots 82 actually enter the water. Surface 148 of the liquid or water is set a distance from screen 128 which is predetermined upon the known size of the crop to be grown. For example, the length of a sprout root 82 is about ⅓ of the mature height of the sprout. Thus, if alfalfa is the crop, the seed support screen in each case will be spaced about ⅓ of an inch above the surface of the water since alfalfa is normally grown to about a one-inch height, meaning the roots are about ⅓ of an inch long. As another example, mung beans are normally grown to a three-inch height and thus have about a one-inch root. Thus if mung beans are the crop to be grown, the surface of the water or liquid level will be spaced about one inch beneath the screen.

In the embodiments shown in FIGS. 6-11, a gravity feed liquid or water supply is not provided as in the case of the first embodiments since the normal growth period is so short (40-48 hours) that it has been found that a reserve supply of water or liquid simply is not needed.

The spacing of perforations in the grid tubes may be considerably farther apart than is shown in FIGS. 5 and 11. In one embodiment, chamber 100 is about 1 foot square. There are but 5 perforations 116 along the bottom of each tube 108.

Since only an upper layer of the water between the aeration grid and the surface of the water or liquid is agitated by air bubbles, waste products or other pollutants which are washed from the sprouts enter the liquid or water and fall beneath the aeration grid to settle on the bottom of the hydroponic chamber. Since the level of water of liquid beneath the aeration grid is essentially still and undisturbed, waste products and other pollutants falling thereinto will remain therein without being recirculated back onto the growing sprouts. Additionally, the water between the aeration grid and the surface is prevented from becoming stagnant because of the constant agitation by air bubbling. Thus, the growing sprouts are in an atmosphere which does not become stagnant. Simultaneously, waste products and pollutants are allowed to fall well beneath the aeration grid so that they are not recirculated or washed back onto the growing sprouts.

The water supply in the hydroponic chamber may be provided with appropriate nutrients if necessary, for example, when plant growth is required. Additionally, the air flow rate may be regulated as desired. For example, flowers such as orchids may require a lower airflow rate than that required for sprouting seeds. In any event, it is believed that the normal atmospheric conditions within the hydroponic chamber approach 100% relative humidity and the temperature maintained therein will normally be in a range of from 68° F to 92° F.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A hydroponic chamber comprising: a liquid holding chamber; a perforated, generally planar seed support member suspended in said chamber entirely above a predetermined level of liquid therein; means defining a substantially uniplanary arranged aeration grid in said chamber, substantially above the bottom of said chamber but just beneath said liquid predetermined level at least within the top one-half of the liquid; and means providing a supply of air under pressure to said aeration grid; said seed support being disposed at a predetermined height above said liquid predetermined level; said predetermined height being dependent upon the type of crop to be grown and so calculated that almost all of the root structure of a selected crop will be suspended in the space defined between said seed support member and said liquid predetermined level during growth; said aeration grid thus providing a supply of air bubbles which coalesce and burst at the surface of said liquid to provide a circulation of moisture droplets and moisture laden air about crop roots growing in said defined space; said chamber being sufficiently deep to define a settling tank of liquid undisturbed by action of said aeration grid, whereby any material washed from said seed support member by action of said aeration grid may fall therebeneath by gravity to settle at the bottom of said chamber so that such material is not recirculated onto the growing crop.

2. The hydroponic chamber claimed in claim 1 wherein said seed support member comprises taut sheet screening material bordered by a frame of inert plastics material.

3. The hydroponic chamber as claimed in claim 2 wherein said sheet screening is made of bronze.

4. The hydroponic chamber as claimed in claim 1 wherein said aeration grid comprises a network of tubular members in fluid communication with one another and means defining a plurality of perforations in said tubular members, said perforations being arranged to provide a horizontal, uniform pattern of air distribution points in said liquid level.

5. The hydroponic chamber as claimed in claim 4 wherein said aeration grid further comprises means for disconnectibly mounting said aeration grid in said chamber.

6. The hydroponic chamber as claimed in claim 5 wherein said disconnectibly mounting means comprises a pair of support struts for mounting said grid in said chamber, and resilient retention means in said chamber for holding said support struts.

7. The hydroponic chamber as claimed in claim 4 wherein the internal diameter of said tubular members is far greater than the diameter of each of said perforations to the extent that said tubular members comprise a holding tank retaining a static head of pressure whereby air distribution through said perforations is uniform throughout the grid.

8. The hydroponic chamber as claimed in 7 wherein the ratio of the diameter of said tubular members to the diameter of said perforations is on the order of 40 to 1.

9. The hydroponic chamber as claimed in claim 8 wherein said diameter of said tubular members is about 0.25 inches (6.4 mm) and the diameter of said perforations is about 0.006 inches (0.15 mm).

10. The hydroponic chamber as claimed in claim 4 wherein said perforations are each formed through the bottoms of said tubular members.

11. The hydroponic chamber as claimed in claim 4 wherein each of said tubular members include a plurality of recesses formed inwardly therebeneath, each said recess having one of said perforations formed therethrough.

12. The hydroponic chamber as claimed in claim 1 further comprising heating means in said liquid holding chamber for heating a supply of liquid to be contained therein.

13. The hydroponic chamber as claimed in claim 1 further comprising cover means over said chamber for defining a relatively closed environment within said hydroponic chamber, said cover means comprising a generally open based pyramid structure having an apex centrally above said chamber.

14. The hydroponic chamber as claimed in claim 13 wherein said cover means further comprise a peripheral border which is concavely configured on the interior of said cover means and so disposed above a border of said seed support means that liquid condensing on the interior of said cover will travel downwardly interiorally on the walls of said pyramidal cover means to said peripheral cover border and thence drop onto said seed support border, whereby condensing liquid is prevented from dropping directly onto said seed support member and from migrating outwardly of said cover.

15. The hydroponic chamber as claimed in claim 14 wherein said cover means peripheral border further comprises means defining a plurality of air openings therethrough communicating with the interior of said cover means.

16. The hydroponic chamber as claimed in claim 1 further including predetermined liquid level maintaining means which comprises a barometric feed reservoir of liquid.

17. A hydroponic method comprising the steps of: suspending seeds to be sprouted a predetermined distance entirely above but closely adjacent the surface of a supply of liquid to create a growing space; determining said distance by the type of crop selected so that almost all of the root structure of the selected crop will be suspended in said space; agitating only a layer of liquid very near the surface of the liquid by bubbling air therethrough to thereby provide a supply of air bubbles which coalesce and burst at the surface of the liquid to provide a circulation of moisture droplets and moisture laden air about the undersides of the seeds and through the roots thereof during sprouting of the seeds; and carrying away waste products and other pollutants from the liquid air agitated layer whereby the same are not recirculated onto the sprouting seeds.

18. The hydroponic method as claimed in claim 17 wherein the step of carrying away waste products and other pollutants includes allowing the same to fall by gravity through the liquid far enough beneath the surface as to be undisturbed by air bubbling in the air agitated level.

* * * * *